March 26, 1946.   H. W. BROWN   2,397,122
METALWORKING MACHINE
Filed July 16, 1941   3 Sheets-Sheet 1

Inventor:
H. W. Brown
by his Attorney

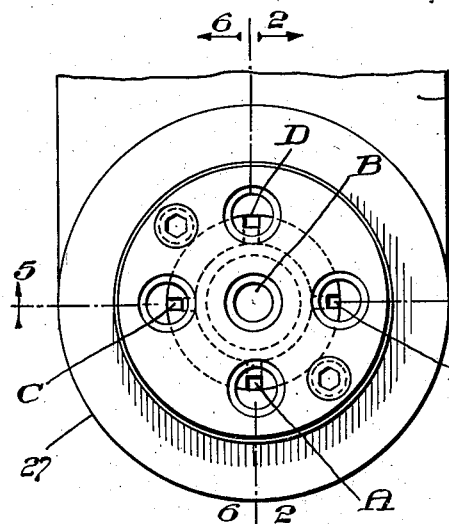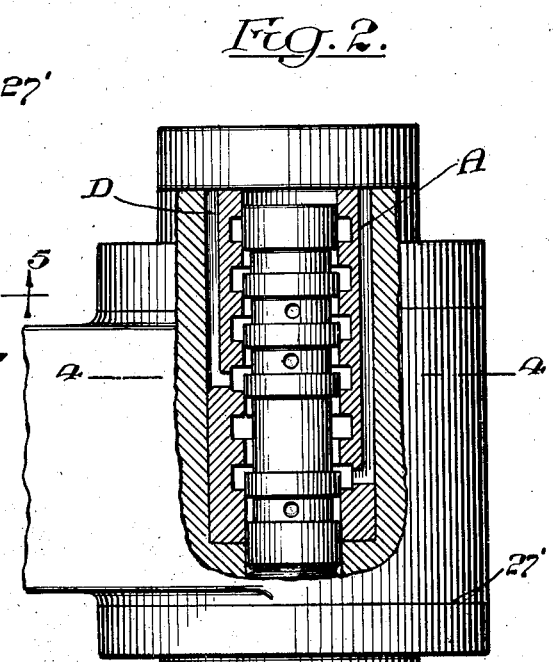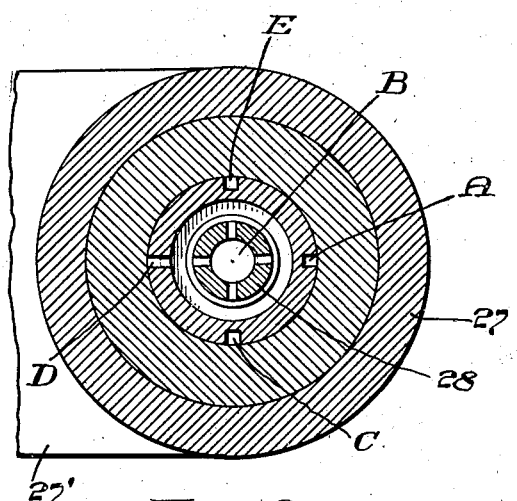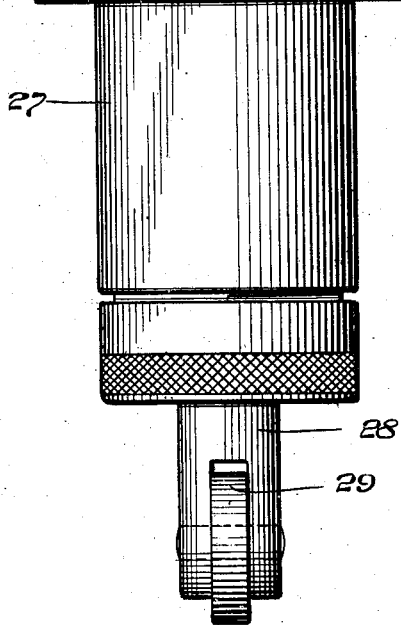

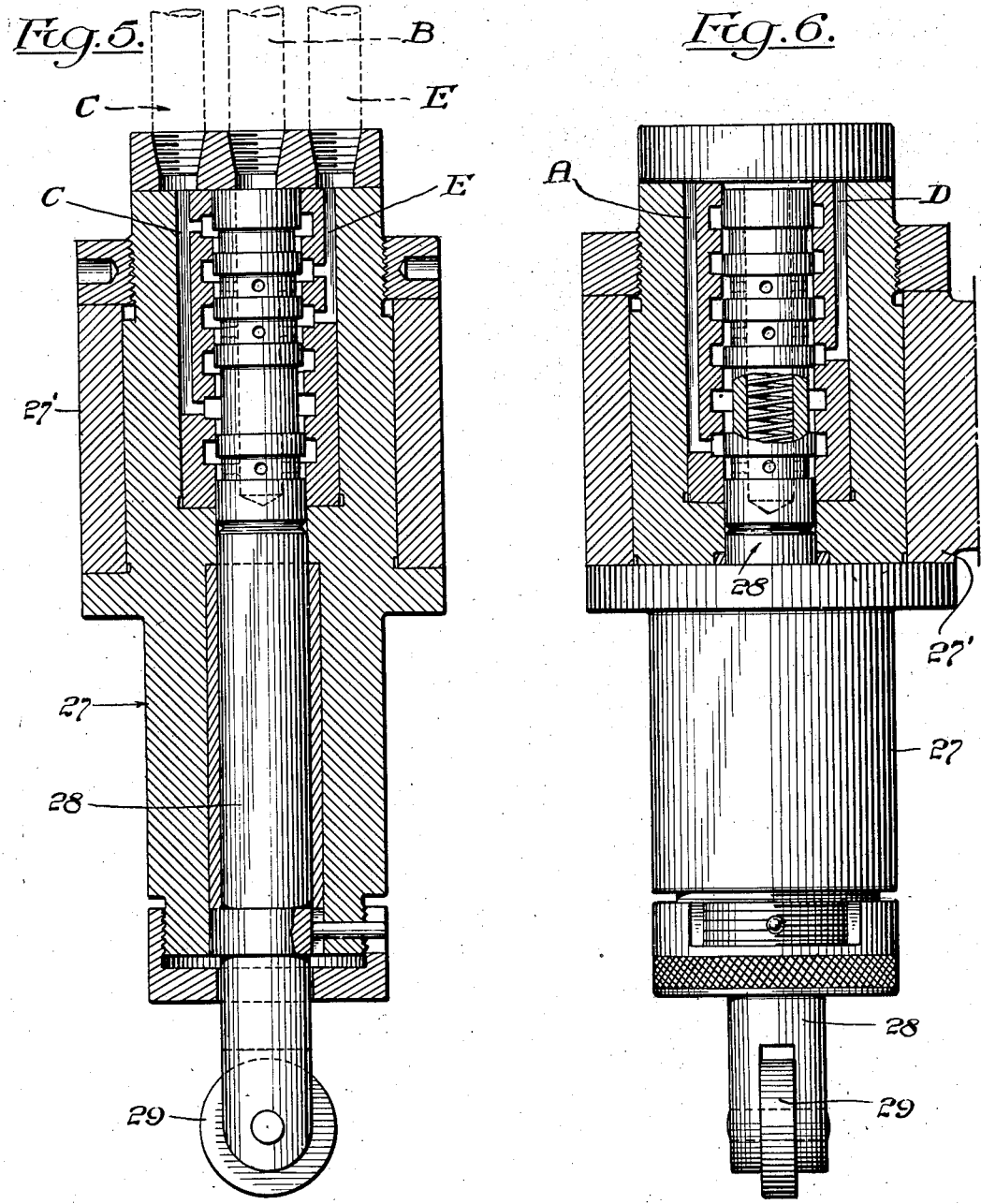

Patented Mar. 26, 1946

2,397,122

UNITED STATES PATENT OFFICE 2,397,122

METALWORKING MACHINE

Harry W. Brown, Cleveland, Ohio, assignor to The National Acme Company, Cleveland, Ohio, a corporation of Ohio Application July 16, 1941, Serial No. 402,598

25 Claims. (Cl. 90—13.6)

This invention relates to metal working machines such, for instance, as milling machines and particularly to what are known as cam milling machines, the object of the invention being to provide a hydraulically operated cam milling machine in which the master cam is not only hydraulically operated but, in turn, controls through the medium of valve mechanism, hydraulic means for shifting the milling cutter with the result that very accurate work is produced in accordance with the contour of the master cam and which accuracy it has heretofore been found difficult if not impossible to obtain in milling machines, especially those electrically operated and those hydraulically operated on a single circuit or servo principle.

A further object of the invention is the provision of an improved milling machine in which the milling cutter slide, instead of being directly operated by the master cam, is operated hydraulically through the medium of valve mechanism cooperating with the cam, a part of which valve mechanism is carried by the cutter slide for movement therewith and another part is operated by the master cam resulting in increased accuracy since the master cam is entirely relieved of any pressure exerted by the cutter head and is, therefore, much more sensitive to movements and it is, consequently, much more accurate than heretofore possible. This is made possible because of the hydraulic balance of the spool design of the pilot tracer valve.

It is very important in order to mill an accurate cam, which has to be held or cut within .001" in lead since this lead on the cam controls the cutting action of the milling tool, that the means controlling the up and down movement of the tool carrier or cutter slide be operated with such accuracy that the milling tool will reproduce and mill cams exactly in accordance with the master cam.

Prior to the present improvement, this operation was accomplished usually by electrical means, solenoid electric contacts operating the lead screw that shifted the cutter slide, but this mechanism is neither as accurate nor as efficient as hydraulic means with independent pilot control and where also, as heretofore, the tool slide was operated up and down directly from the master cam, accuracy of the work was not possible for it will be noted that, in the present improvement, the master cam is entirely relieved of any pressure exerted by the sliding cutter head and only controls the action of the pilot tracer valve spool or piston so that the mechanism is very accurate and more sensitive to movement. Furthermore, an inexpensive master cam of light weight can be used since it does not directly shift a heavy moving part such as the tool slide. In the present improvement, the valve housing being rigidly secured to the cutter slide for movement therewith and its valve stem or piston movable relative to this housing and alone operated by the master cam, a dual movement of the parts is, therefore, obtained with increased accuracy.

In the drawings accompanying and forming a part of this specification,

Fig. 2 is a partly sectional view of the master cam-controlled pilot tracer valve taken on line 2—2 of Fig. 3.

Fig. 3 is a top view thereof.

Fig. 4 is a cross-sectional view taken on line 4—4 of Fig. 2.

Fig. 5 is a vertical sectional view taken on line 5—5 of Fig. 3, and

Fig. 6 is a vertical sectional view taken on line 6—6 of Fig. 3, Figs. 2, 5 and 6 showing different positions of the piston valve relative to its ports.

Similar reference characters indicate corresponding parts in the several views.

Figure 1:
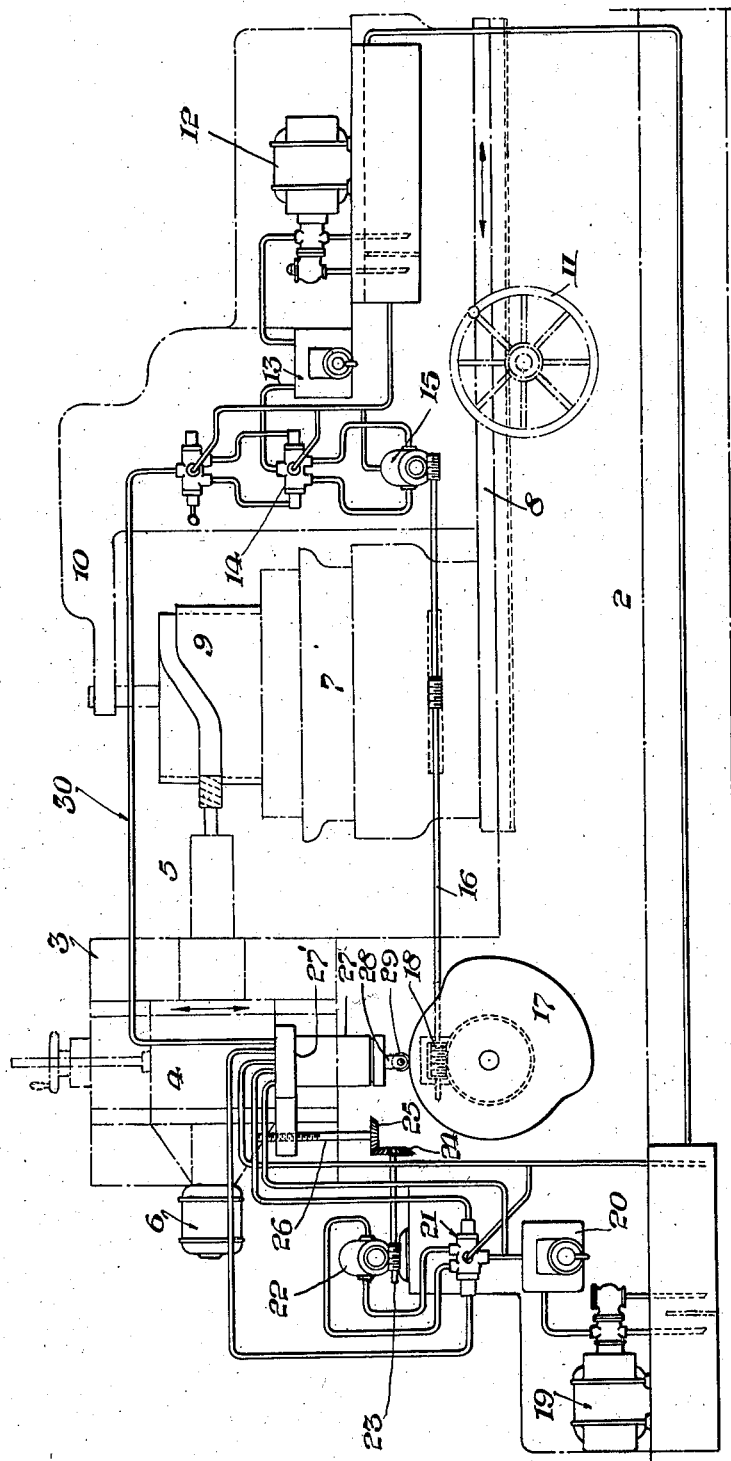
Fig. 1 is a side view of this improved metal working machine shown in the form of a milling machine.

Before explaining in detail the present improvement and its mode of operation, it is to be understood that the invention is not limited to the details of construction and arrangement of parts illustrated in the accompanying drawings since the invention is capable of other embodiments and that the phraseology employed is for the purpose of description and not of limitation.

This metal working machine when in the form of a cam milling machine comprises a suitable framework or base 2 having at one end, as the left hand end shown in Fig. 1, an upright column 3 slidingly supporting a shiftable tool support or head 4 carrying a rotatable milling cutter spindle 5 rotated by a variable speed motor 6 although, of course, this cutter spindle may be driven either by gears or a belt.

Centrally of the base 2 is a rotatable work support or table 7 carried by a slide 8 and having a work holder 9 and a work holding support 10. The table 7 and its slide 8 may be shifted forward or backward depending upon the depth of the groove cut by the milling cutter, by means of a hand wheel 11 and the usual connecting means. This table 7 is rotated by hydraulically operated means which, for this purpose, comprises a hydraulic unit comprising a motor 12 operating through a feed control valve 13 to a control valve 14 and fluid motor driving means 15 rotating a worm shaft 16 cooperating with suitable connecting means and by means of which the table 7 is rotated.

This worm shaft 16 controls not only the rotation of the rotary work support or table 7 but also controls rotation of the interchangeable master cam 17 which is in fixed position on the upright column 3 of the base. The worm shaft 16 has a splined connection with the worm 18 that rotates the master cam 17 so that this shaft 16 may slide back and forth with the table and according to the position of the milling cutter relative to the work.

This master cam 17 controls the shifting or sliding movement vertically of the milling cutter on the upright column 3 through the medium of another hydraulic unit somewhat similar to that hereinbefore described and comprising a motor 19, a feed control valve 20, a valve 21 and a fluid motor 22 which rotates a worm shaft 23 having a bevel gear 24 in mesh with a similar gear 25 secured to a lead screw 26 cooperating with a nut of the cutter head for shifting the cutter head vertically. The operation of this fluid motor is controlled by the master cam 17 through the valve 21 which is controlled by the pilot tracer valve 27, the casing or housing 27' of which is adjustably mounted on the milling cutter head in any suitable manner for movement therewith while the spring pressed spool or piston 28 of this valve has a tracer roller 29 in direct engagement with the master cam 17 so as to follow the contour of that cam. Consequently, as the piston or spool is moved up or down, the various ports of the valve, as A, B, C, D and E are opened or closed shifting the valve 21 and the fluid motor 22 is operated in accordance therewith to rotate the shaft 23 and thereby the worm shaft 26 which, through the medium of the nut carried by the cutter head, moves the cutter head and, therefore, the milling cutter up or down in accordance with the contour of the cam as will be readily understood.

By reason of the fact that the valve housing 27' is adjustably mounted on the sliding milling cutter head 4 while the valve spool or piston 28 has a movement independent of the movement of its casing and is operated and controlled by the master cam, it follows that, whenever the roller 29 and its valve spool 28 move in an upward or downward direction, the cutter head slide also moves simultaneously in an upward or downward direction and this automatically closes or opens the by-pass of the valve mechanism.

It will thus be observed that the rotary work table is hydraulically operated and the hydraulic unit for operating this table also operates the master cam which, in turn, controls the pilot tracer valve that controls the four-way valves 14 and 21 of the hydraulic units by means of which the milling cutter is shifted vertically so as accurately to follow whatever contour the master cam may have.

From the foregoing, it follows that the tracer roller 29, following a rise on the master cam, allows pressure to pass into the port D, thereby causing the valve 21 to shift and cause the sliding tool head to rise and, therefore, carrying the valve housing or body therewith per .001" rise of the tracer roller, as illustrated in Fig. 5. When the tracer roller stops, the sliding tool head carries the valve body to that position where movement thereof is stopped, as illustrated in Fig. 6. The tracer roller 29 following a decline in the master cam allows pressure to pass into the port A causing the cutter head to move downwardly carrying the valve body per .001" downwardly of the tracer roller, as illustrated in Fig. 2, and when the tracer roller stops, the cutter head carries the valve body into a stopped position, as illustrated in Fig. 6.

Thus, this metal working machine is operated by a pilot tracer valve 27 (Figs. 2, 3, 4, 5 and 6). The pilot tracer valve circuit operates the pilot valves 14 and 21 and these valves, in turn, start and stop the fluid drives 15 and 22. The volume of oil required to actuate the fluid drives 15 and 22 does not pass through the pilot tracer valve. The valves 14 and 21 are pilot-operated four-way spring centering valves. When the pilot tracer valve spool 28 moves into upward position (Fig. 5) pilot pressure passes through the port D (Fig. 6) and its line, shifting the valve 21 and starting the fluid drive 22 to drive the spindle head 4 upwardly by the gearing 23—24—25—26. When the pilot tracer valve spool 28 moves downwardly, pressure passes to the port A, shifting the valve 21 in the opposite direction and driving the head 4 downwardly. When the pilot tracer valve spool 28 is in mid-position, pressure is on port E (Fig. 5), line 30 (Fig. 1) passing through the direction control valve 13 (Fig. 1), shifting the valve 14 and starting the fluid drive 15, thereby rotating the table in the direction predetermined by a hand control valve.

The pilot tracer valve 27 is fitted to the slide on the head 4 with micrometer adjustment to enable the operator to position the cutter relative to the work 9 and the cam or template 17. By turning the micrometer screw in a direction to cause the pilot tracer valve to move downwardly, the cutter head will move upwardly. This micrometer adjustment is graduated to read in .001". Therefore, if the pilot tracer valve is moved up .001", the head will move down .001". This pilot tracer valve has no dual linkage—it is operated directly by the cam or template 17.

The valve 27 is connected by a flexible conduit 30 with the hydraulic unit controlling the rotation of the work table so that as the tracer roller 29 rises or descends by the rotation of the master cam 17, the port E is opened to drain in proportion to the decreasing volume of the oil or fluid drive of the work table, thereby to decrease the rotary feed movement of the table and so provide a constant feed of cutter in angular or parabola milling. In other words, if the table moves slowly, the proportion of the oil thereby controls the master cam in accordance with that slow movement. If, on the other hand, the table moves fast, the oil likewise controls the master cam so that its speed is increased and they both have to synchronize—otherwise, there will be an error in the curve of the cam 9 and master cam 17.

By having the valve housing 27 adjustably secured, the cutter and cutter head can be adjusted to suit any height or dimension of the work to be milled without disturbing the master cam or the movement of the dual valve so that it may be said the valve has a triple movement.

Obviously, this same cam controlled valve mechanism could be used in various forms of metal working machines requiring step turning or form turning of different diameters and different lengths and employing a cutting tool or grinding wheel which has to be moved forward or backward and controlled by a master cam to machine parts of different shapes and diameters.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same although without attempting to set forth all of the forms in which it may be made or all of the modes of its use, I claim:

1. In a cam milling machine, the combination of a slidingly supported rotatable table, a hydraulic unit for rotating said table and including a worm shaft connected therewith and with the hydraulic unit, a sliding tool support adapted to carry a tool such as a milling tool, a hydraulic unit for shifting said tool support and including a lead screw, and means for controlling the operation of said second hydraulic unit and thereby the shiftable movement of the tool support and comprising a rotatable cam having a fixed position against movement relative to the tool support and a splined connection with the table operating worm shaft whereby it is rotated thereby, and valve mechanism comprising a housing connected to the tool support for movement therewith and a piston movable relative to the housing by the cam.

2. In a cam milling machine, the combination of a slidingly supported rotatable table, a hydraulic unit for rotating said table and including a worm shaft connected therewith and with the hydraulic unit, a sliding tool support adapted to carry a tool such as a milling tool, a hydraulic unit for shifting said tool support and including a lead screw, and means for controlling the operation of said second hydraulic unit and thereby the shiftable movement of the tool support and comprising a rotatable cam having a fixed position relative to the tool support and a splined connection with the table operating worm shaft whereby it is rotated thereby, and valve mechanism comprising a housing connected to the tool support for movement therewith and a piston movable relative to the housing by the cam, said valve mechanism having a series of ports opened by the cam operated piston thereby to control the tool operating hydraulic unit to shift the tool support and housing in accordance with the contour of the cam, the shifting of the housing effective to close the ports thereby to stop operation of said hydraulic tool operating unit.

3. In a cam milling machine, the combination of a rotatable work support, hydraulically operated means for rotating said work support, a sliding tool support carrying a tool such as a milling cutter, hydraulically operated means for shifting said tool support, means for shifting said tool support in accordance with the work to be done and comprising a cam fixedly supported independent of the work support, a valve cooperating with the cam for controlling the operation of said last hydraulic means, and means connecting said valve with the work support hydraulically operating means whereby the feed of the table is also controlled by said valve.

4. In a metal working machine, the combination of a rotatable work support, a shiftable tool support, means for rotating the work support, means for shifting the tool support, means for controlling the movement of said tool support shifting means and comprising a rotatable cam fixedly supported independent of the work support and a dual movement valve, and means connecting said valve with the means for rotating the work support whereby the feed movement of said work support is also controlled by said valve.

5. In a metal working machine, the combination of a rotatable work support, a shiftable tool support, hydraulic means for shifting the tool support, means for controlling the operation of said hydraulic operating means of the tool support and comprising a rotatable cam fixedly supported independent of the work support and a valve, and a conduit connecting said valve with the hydraulic means for rotating the work support whereby the feed movement of said work support is also controlled by said valve.

6. In a metal working machine having a base and a fixed upright supporting column, the combination of a work support mounted on the base, a shiftable tool support mounted on the column, a lead screw for shifting the tool support, fluid means for operating said lead screw, fluid means for rotating said work support, and means for controlling the operation of said first fluid operated means and comprising a cam pivotally supported on the fixed column for rotation and valve mechanism comprising a housing carried by the shiftable tool support and a spool piston mounted in said housing and having direct engagement with the fixed rotatable cam for controlling the operation of said first fluid means thereby to shift the tool support and rotate the work support.

7. In a metal working machine, the combination of a rotary work support, fluid means for operating said work support, a shiftable tool support, a lead screw for shifting said tool support, fluid means for operating said lead screw, means for controlling the operation of said last fluid means and comprising a cam carried by a fixed support, a piston valve cooperating with said cam and a valve housing carried by the tool support and shiftable therewith whereby movement of the piston valve will operate the lead screw operating means to shift the tool support and housing in accordance with the contour of the cam, the movement of said housing effective to stop operation of the lead screw, and means for shifting said rotary work support toward and from the tool support.

8. In a metal working machine, the combination of a rotary work support, fluid means for operating said work support, a shiftable tool support, a lead screw for shifting said tool support, fluid means for operating said lead screw, means for controlling the operation of said last fluid means and comprising a cam carried by a fixed support, a piston valve cooperating with said cam, and a valve housing carried by the tool support and shiftable therewith whereby movement of the piston valve will operate the lead screw operating means to shift the tool support and housing in accordance with the contour of the cam, the movement of said housing effective to stop operation of the lead screw, and fluid means for operating said cam.

9. In a metal working machine, the combination of a rotatable work support, fluid operated means for rotating said support, a shiftable tool support, a lead screw for shifting said tool support, fluid means for operating the lead screw, and means for controlling the operation of said last fluid means and comprising a rotatable cam, a ported valve having a piston cooperating with said cam, and a valve housing carried by and shiftable with the tool support whereby movement of the piston will open the ports to effect operation of the lead screw operating means to shift the tool support and housing and the shifting of the housing will close the ports to stop operation thereof.

10. In a metal working machine, the combination of a rotatable work support, fluid operated means for rotating said support, a shiftable tool support, a lead screw for shifting said tool support, fluid means for operating the lead screw, and means for controlling the operation of both of said fluid means and comprising a rotatable cam, a ported valve having a piston cooperating with said cam, and a valve housing carried by and shiftable with the tool support whereby movement of the piston will open the ports to effect operation of the lead screw operating means to shift the tool support and housing and effect rotation of the work support, and the shifting of the housing will close the ports to stop operation of the lead screw.

11. In a metal working machine, the combination of a rotatable work support, fluid operated means for rotating said support, a shiftable tool support, a lead screw for shifting said tool support, fluid means for operating the lead screw, means for controlling the operation of said last fluid means and comprising a rotatable cam, a ported valve having a piston cooperating with said cam, and a valve housing carried by and shiftable with the tool support whereby movement of the piston will open the ports to effect operation of the lead screw operating means to shift the tool support and housing and the shifting of the housing will close the ports to stop operation thereof, and means connecting the fluid operated means for rotating the work support with the cam for rotating said cam.

12. In a metal working machine, the combination of a shiftable tool support, a lead screw for shifting it, fluid means for operating the lead screw, and fluid means for controlling the operation of said fluid means and comprising a rotatable cam carried by a fixed support, a valve cooperating therewith and having a housing adjustably mounted on the tool support for movement therewith, and a cam engaging piston carried by said housing and having movement relative to its housing whereby said valve has a dual movement.

13. In a cam milling machine, the combination of a sliding and rotatable work support, fluid operated means for rotating said work support, a sliding tool support carrying a tool such as a milling cutter, a lead screw for shifting said tool support in accordance with the work to be done, fluid means for operating the lead screw, and means for controlling the operation of said last fluid means and comprising a cam carried by a fixed support, a piston cooperating with said cam and a housing for said piston and connected to and shiftable with the tool support.

14. In a cam milling machine, the combination of a sliding and rotatable work support, fluid operated means for rotating said work support, a sliding tool support carrying a tool such as a milling cutter, a lead screw for shifting said tool support in accordance with the work to be done, fluid means for operating the lead screw, means for controlling the operation of said last fluid means and comprising a cam a piston cooperating with said cam and a housing for said piston and adjustably connected to and shiftable with the tool support, and means for rotating the cam.

15. In a cam milling machine, the combination of a sliding and rotatable work support, fluid operated means for rotating said work support, a sliding tool support carrying a tool such as a milling cutter, a lead screw for shifting said tool support in accordance with the work to be done, fluid means for operating the lead screw, means for controlling the operation of said last fluid means and comprising a cam a piston cooperating with said cam and a housing for said piston and connected to and shiftable with the tool support, and means for rotating the cam through the medium of the fluid mechanism for rotating the work support.

16. In a cam milling machine, the combination of a sliding and rotatable work support, fluid operated means for rotating said work support, a sliding tool support carrying a tool such as a milling cutter, a lead screw for shifting said tool support in accordance with the work to be done, fluid means for operating the lead screw, means for controlling the operation of said last fluid means and comprising a cam a piston cooperating with said cam and a housing for said piston and connected to and shiftable with the tool support, and means for rotating the cam through the medium of the fluid mechanism for rotating the work support and comprising a worm shaft having a splined connection with the cam.

17. In a cam milling machine, the combination of a slidably supported rotatable work table, fluid mechanism for rotating said table and including a worm shaft, a slidable tool head for supporting a tool such as a milling tool, a lead screw for shifting said tool head, fluid means for operating the lead screw, a cam fixedly supported against all movement except rotation by said worm shaft and with which said worm shaft has a splined connection, a valve for controlling the operation of said lead screw fluid operating means and comprising a housing connected to and slidable with the tool head, and a piston shiftable relative thereto and cooperating with the cam for movement thereby, thereby to operate the fluid unit operating the lead screw to shift the tool head in accordance with the contour of the cam.

18. In a metal working machine, the combination of a work support, a shiftable tool support, means including fluid operated means for shifting the tool support, and means for controlling the operation of said fluid operated means and comprising a rotatable cam carried by a fixed support, a piston valve and a ported housing, one carried by the tool support and shiftable therewith and the other in engagement with the rotatable cam for movement thereby, thereby to shift the tool support in accordance with the contour of the cam.

19. In a metal working machine, the combination of a work support, a shiftable tool support, means including fluid operated means for shifting the tool support, and means for controlling the operation of said fluid operated means and comprising a rotatable cam carried by a fixed support, a piston valve, a ported housing, one carried by the tool support and shiftable therewith and the other in engagement with the rotatable cam for movement thereby, thereby to shift the tool support in accordance with the contour of the cam, and fluid operated means for rotating said cam.

20. In a metal working machine, the combination of a rotatable work support, fluid operated means for rotating it, a shiftable tool support, means including fluid operated means for shifting the tool support, and means for controlling the operation of said fluid operated means and comprising a rotatable cam carried by a fixed support, a piston valve and a ported housing, one carried by the tool support and shiftable therewith and the other in engagement with the rotatable cam for movement thereby, thereby to shift the tool support in accordance with the contour of the cam.

21. In a metal working machine, the combination of a rotatable work support, fluid operated means for rotating it, a shiftable tool support, means including fluid operated means for shifting the tool support, and means for controlling the operation of said fluid operated means and comprising a rotatable cam carried by a fixed support, a piston valve and a ported housing, one carried by the tool support and shiftable therewith and the other in engagement with the rotatable cam for movement thereby, thereby to shift the tool support in accordance with the contour of the cam, and means connecting the fluid operated means for rotating the work support with the cam for rotating said cam.

22. In a metal working machine, the combination of a rotatable work support, fluid operated means for rotating it, a shiftable tool support, means including fluid operated means for shifting the tool support, and means for controlling the operation of said second fluid operated means and comprising a rotatable cam carried by a fixed support, a piston valve and a ported housing, one carried by the tool support and shiftable therewith and the other in engagement with the rotatable cam for movement thereby, thereby to shift the tool support in accordance with the contour of the cam, and means connecting the fluid operated means for rotating the work support with the cam for rotating said cam, said cam also controlling the operation of said work support.

23. The structure of claim 8 in which said last fluid operating means includes means for also controlling the operation of the work support.

24. In a metal working machine, the combination of a rotatable work support, a shiftable tool support, means including fluid operated means for shifting the tool support, and means for controlling the operation of said fluid operated means and comprising a rotatable cam pivotally supported by a fixed support and having its pivotal axis at an angle to the axis of the rotatable work support, a piston valve and a ported housing, one carried by the tool support and shiftable therewith and the other in engagement with the rotatable cam for movement thereby, thereby to shift the tool support in accordance with the contour of the cam.

25. In a metal working machine, the combination of a rotatable work support, a shiftable tool support, means including fluid operated means for shifting the tool support, and means for controlling the operation of said fluid operated means and comprising a rotatable cam pivotally supported by a fixed support and having its pivotal axis at right angles to the axis of the rotatable work support, a piston valve and a ported housing, one carried by the tool support and shiftable therewith and the other in engagement with the rotatable cam for movement thereby, thereby to shift the tool support in accordance with the contour of the cam.

HARRY W. BROWN.